Figure 1:
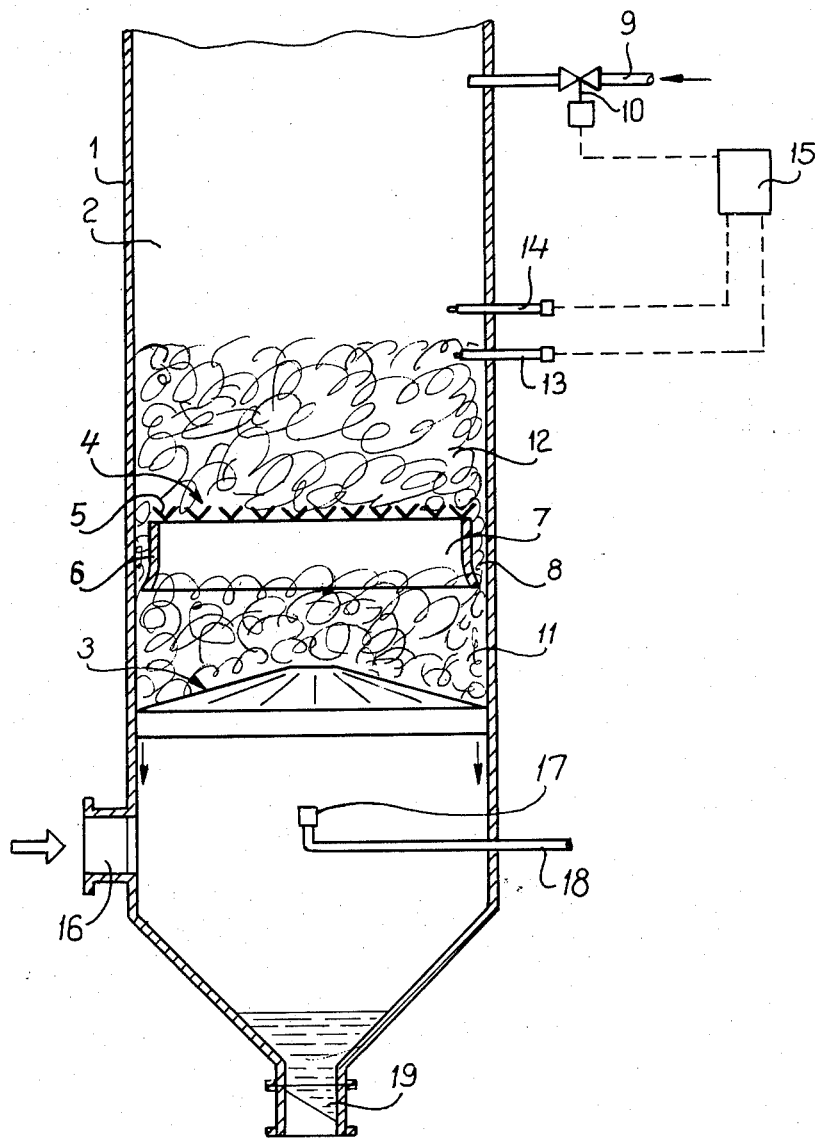

United States Patent [19]

Vikholm

[11] 3,992,492
[45] Nov. 16, 1976

[54] APPARATUS FOR CONTACTING A GAS AND A LIQUID

[75] Inventor: Kurt Yngve Vikholm, Norsborg, Sweden

[73] Assignee: Alfa-Laval AB, Tumba, Sweden

[22] Filed: July 7, 1975

[21] Appl. No.: 593,489

[30] Foreign Application Priority Data
July 8, 1974 Sweden............................ 7408925
Sept. 9, 1974 Sweden............................ 7411341-6

[52] U.S. Cl................................. 261/110; 55/220; 261/DIG. 26
[51] Int. Cl.² ........................................... B01F 3/04
[58] Field of Search................. 261/DIG. 26, 94, 96, 261/97, 108, 110; 55/87, 178, 220, 233, 227

[56] References Cited
UNITED STATES PATENTS

| | | | |
|---|---|---|---|
| 1,958,383 | 5/1934 | Naucler et al. | 261/DIG. 26 X |
| 2,471,571 | 5/1949 | Kimmell | 55/178 X |
| 3,155,472 | 11/1964 | Huppke | 55/233 X |

Primary Examiner—Frank W. Lutter
Assistant Examiner—William Cuchlinski, Jr.
Attorney, Agent, or Firm—Cyrus S. Hapgood

[57] ABSTRACT

In an apparatus for contacting a gas with a liquid, the gas is caused to flow upward through a vertical channel associated with a device for charging the channel with a foam containing the liquid. The channel contains upper and lower gas-permeable elements each arranged to support a layer of the foam covering the through-flow area of the channel, each element being formed to cause turbulence of the gas flowing therethrough. The two foam-supporting elements are located so close to each other that foam is entrained by the flowing gas from the space between the elements upwardly through the upper element to the upper side thereof, from which foam is returned through a passage to the space between the two elements. This return passage is shielded from upward flow of gas therethrough, so that a foam column in the passage can move downward.

9 Claims, 4 Drawing Figures

APPARATUS FOR CONTACTING A GAS AND A LIQUID

The present invention relates to an apparatus for obtaining contact between a gas and a liquid, comprising a vertical channel arranged for through-flow of the gas from below and upwards, equipment for charging the channel with a foam containing the said liquid, and a gas-permeable foam supporter arranged in the channel and on which the foam rests so that it covers the through-flow area of the channel.

An apparatus of this kind is described in British Pat. No. 1,231,505. The apparatus according to this patent may be used for cleaning chimney gases from particles suspended therein. It may also be used where a reaction is desired between the foam liquid and the flowing gas, such as a chemical reaction. Further fields of application are possible.

In British Pat. No. 1,341,306, there is described more in detail a foam supporter for an apparatus of the above-described kind. As can be seen from this patent, the foam supporter has several different objects. Besides supporting the foam in the apparatus, the foam supporter is intended to cause turbulence of the gas flowing therethrough, so that the contact between the gas and the foam resting on the foam supporter will become as effective as possible. Further, the foam supporter is intended to carry off the liquid that is formed due to the continuous breaking down of foam during operation of the apparatus.

In the operation of this kind of apparatus, it has been found that an increase of the thickness of the foam bed on the foam supporter has a correspondingly improving influence on the degree of efficiency of the apparatus, i.e., on the efficiency of the contact between the gas and the foam liquid, but that this is achieved only up to a certain thickness of the foam layer. When this thickness is exceeded, no corresponding improvement of the degree of efficiency of the apparatus is obtained. (Said thickness varies from case to case depending, among other things, on which kind of foam supporter is used.)

Therefore, if the contact between a gas and a liquid proves to be unsatisfactory during use of an apparatus of this kind, the obtainment of a better result requires two or more apparatuses connected in series, by arranging them one above the other in connection with the same vertical channel.

An arrangement of this kind would become very space consuming and also very expensive, as it involves a multiplying of the control equipment of the apparatus, comprising means for sensing the amount of foam in the apparatus, and means for the supply of new foam according to need.

An object of the present invention is to provide a compact apparatus of the initially described kind, which has the same increased degree of efficiency as the above-described arrangement of two or more apparatuses connected in series, but which does not require any multiplying of the said control equipment.

This object is achieved by providing the foam supporter with two vertically spaced gas permeable elements, each of these elements being arranged to support foam so that it covers the through-flow area of the channel, the elements also being arranged so close to each other that foam will be entrained by the upflowing gas from the space between the elements up through the upper element to the upper side of it, a passage being arranged for conducting foam back from the upper side of the upper element to the space between the elements, which passage is shielded from flow of gas in the upward direction, so that a foam column situated therein will be able to move downwards.

In an apparatus constructed in this manner, it is possible to maintain two different foam layers with an optimum thickness, considered from the efficiency point of view, control equipment being required only for maintaining one of the foam layers. The invention is based on the feature that a constant circulation of foam is taking place in the apparatus, from the lower foam layer to the upper one, via the upper foam supporting element, and back to the lower foam layer via the said passage. New foam may be supplied to the apparatus into the lower or upper foam layer, at will.

The apparatus according to the invention may be made substantially lower than an arrangement consisting of several conventional apparatuses placed above each other.

According to a further development of the invention, any desired number of additional foam supporting elements, each adapted to support a foam layer with an optimum height, may be arranged between two foam supporting elements of the first-mentioned kind without the need of any further control equipment. The above-mentioned passage for carrying foam downwards from the upper foam layer to the lower foam layer is then shielded from connection with the spaces between the additional foam supporting elements and with the space between the two upper foam supporting elements.

The distances between the different foam supporting elements in this embodiment, too, are so small that foam will necessarily be entrained from each foam layer to the foam layer next above. Foam will thus be circulated from the lowermost foam layer via the intermediate foam layers to the uppermost foam layer, from where it will be returned via the said passage to the lowermost foam layer.

The invention is described in more detail below with reference to the accompanying drawings, in which FIGS. 1 through 4 are vertical sectional views of four different embodiments of the apparatus according to the invention.

The apparatus in FIG. 1 comprises a housing 1 through which a vertical channel 2 extends, and two gas permeable elements 3 and 4 arranged in the channel 2 in vertically spaced relation to each other. The lower gas permeable element 3, which is suitably supported by the housing 1, is of the kind described in British Pat. No. 1,341,306, while the upper element 4 is of another kind. (Both of the elements may be of the same kind.) The upper element 4 comprises a number of strips 5, V-formed in cross section, which extend across the channel 2 spaced from each other. The strips 5 are supported by a hollow circular body 6 which is open at its upper and lower parts for the through-flow of gas. The body 6, which is suitably secured in the housing 1, encloses a through-flow channel 7 and forms with the housing 1 a surrounding passage 8 separated from the channel 7.

The apparatus also comprises an inlet tube 9 for supplying a foam, and a shut off valve 10 arranged in this tube. Numerals 11 and 12 designate foam which has been supplied into the channel 2 through the tube 9 and which rests in the form of foam layers on the gas permeable elements 3 and 4, respectively. The foam in the channel 2 has a foam coefficient lower than 20, preferably about 10, and thus appears substantially as a liquid. The expression "foam coefficient" means the volume ratio between the gas and the liquid present in the foam.

Above the upper element 4 there are arranged at different heights two foam sensing means 13 and 14. These are connected to a unit 15 operable in response to signals from the sensing means 13 and 14 to open or close the valve 10, so that the correct amount of foam is always present in the channel 2. The control equipment 13–15 is of a conventional kind and needs no further description here.

Below the lower element 3, the housing 1 has an inlet 16 for gas which is to flow through the channel 2 in the upward direction. Immediately below the element 3, a nozzle 17 arranged in the middle of the channel 2 is turned upwards toward the element 3. The nozzle 17 serves for intermittent spraying of liquid onto the element 3 during operation of the apparatus, to prevent any particles accompanying the gas from clogging parts of the element. The nozzle 17 is connected to a liquid source (not shown) through a conduit 18. At the bottom, the housing 1 has a liquid outlet 19.

In the operation of the apparatus, the incoming gas contains particles to be separated by means of foam. This particle-containing gas enters through the inlet 16 and is brought into violent turbulence in its passage through the lower element 3. The element 3 also causes the flow of gas to become substantially uniform over the whole cross section of the channel 2. An effective contact is thus achieved between the gas and the foam layer 11 resting upon the element 3. The gas then continues upwards through the channel 7 in the body 6, fractions of foam being entrained from the foam layer 11 up through the upper element 4 to the upper foam layer 12.

In its passage through the slots between the strips 5 in the element 4, the gas again will be brought into violent turbulence so that an effective contact is achieved also between the gas and the foam layer 12. The gas then continues upwards through the channel 2, substantially freed from particles which have been entrapped and maintained by the foam layers 11 and 12.

Continuously during operation of the apparatus, foam runs off the foam layer 12 down through the passage 8 to the foam layer 11 at the same rate as foam is entrained by the gas from the foam layer 11 up through the element 4. The passage 8 is shielded from through-flow of gas in the upward direction, so that the foam column in the passage 8 is able to move downwards due to its own weight. The gas pressure below the element 4 is somewhat higher than the gas pressure above this element, due to the pressure drop of the gas in its passage through element 4.

In the apparatus in FIG. 1, the thickness of the lower foam layer 11 will automatically be kept substantially constant. This thickness is determined in part by the magnitude of the resistance to through-flow of gas caused by the element 4 and also by the foam composition (foam coefficient), which determines the weight of the foam column in the passage 8. Also, the shape of the passage 8 is of importance in this connection.

During operation of the apparatus, parts of the foam are continuously broken down to liquid in which particles separated from the gas are suspended or possibly dissolved. This liquid runs through the foam down to the lower element 3, which conducts liquid to the peripheral walls of the channel 2. The liquid then runs further along the vertical inner surface of the wall of housing 1, as illustrated by arrows, down to the outlet 19.

When so much foam has been broken down to liquid that the upper surface of the foam layer 12 is lowered below the sensing means 13, the unit 15 operates to open the valve 10. New foam is then supplied into the channel 2 until the upper surface of the foam layer 12 reaches the sensing means 14. The unit 15 then operates to close the valve 10.

At regular intervals liquid is sprayed onto the lower element 3 by means of the nozzle 17, to prevent particles separated from the gas from clogging parts of the element 3. A time-controlled valve (not shown) is arranged in the conduit 18 to perform such spraying. Any corresponding spraying of the underneath side of the upper foam supporting element 4 is not necessary, as this is constantly kept wet by foam which is entrained by the gas from the foam layer 11.

Figure 2:
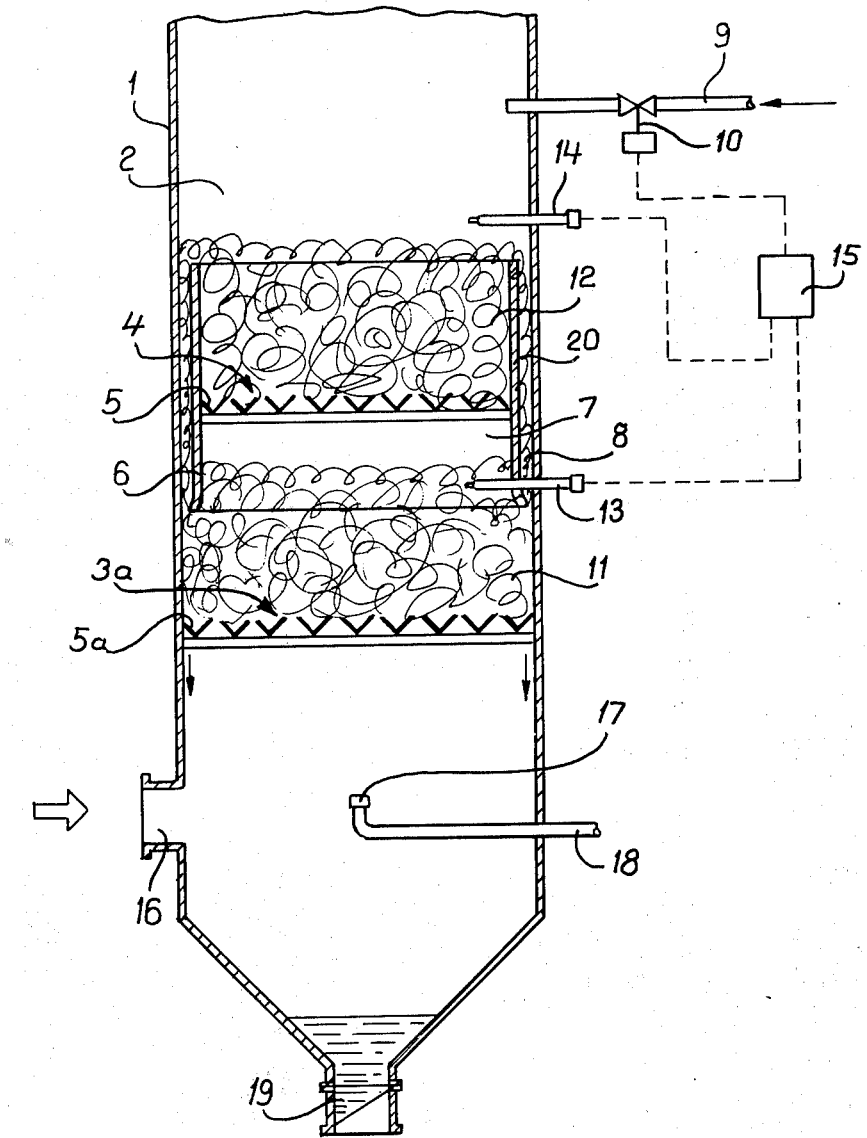

The embodiment of the new apparatus shown in FIG. 2 operates in essentially the same way as the embodiment according to FIG. 1 but differs therefrom in some respects. The two foam supporting elements 3a and 4 in this FIG. 2 embodiment are of the same construction, comprising a number of strips 5a and 5, respectively, V-formed in cross section, which extend in parallel relation across the channel 2 spaced from each other. The strips 5a of the element 3a are inclined a few degrees in their longitudinal direction (not shown), so that liquid may run along the strips to one of the peripheral walls of the channel 2 (or to opposite peripheral walls of the channel). In this embodiment, the body 6 is prolonged upwards with a part 20 situated above the upper foam supporting element 4. The height of this part 20 will determine, during operation of the apparatus, the thickness of the foam layer 12. The upper edge of the surrounding wall of the part 20 constitutes an overflow outlet for foam supported by the element 4.

In this FIG. 2 embodiment too the two foam supporting elements 3a and 4 are arranged so close to each other that entrainment of foam from the foam layer 11 to the foam layer 12 via the channel 7 is ensured. The upper foam surface of the foam layer 12 thus will never drop more than to the upper edge of the part 20. The sensing means 13, which is arranged via the unit 15 to open the valve 10 when sensing an absence of foam, for this reason is placed so that it will sense when the upper foam surface of the lower foam layer 11 is lowered below a certain level.

Figure 3:
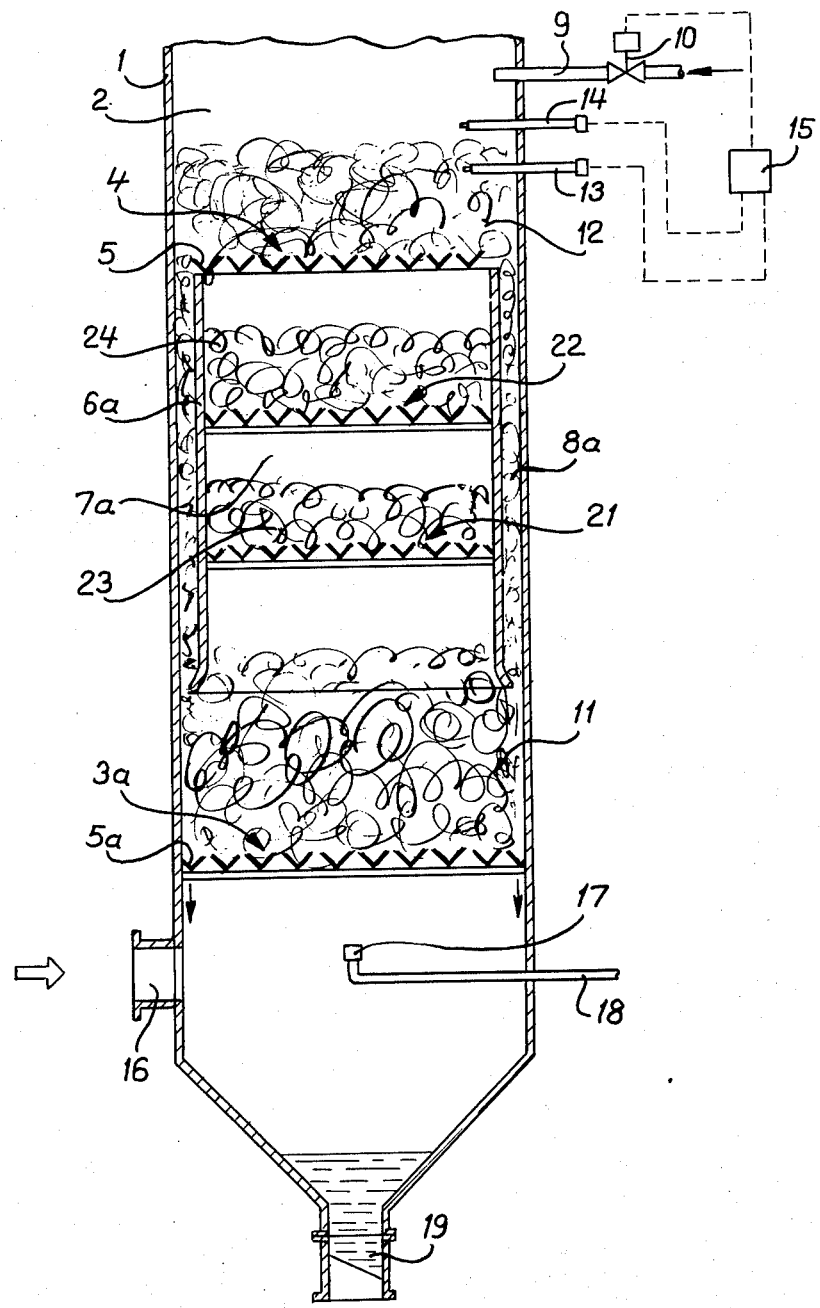

According to the embodiment in FIG. 3, there are two foam supporting elements 21 and 22 in addition to the lower and upper foam supporting elements 3a and 4, respectively. These further elements 21 and 22 are arranged between the elements 3a and 4 in a channel 7a which extends through a hollow body 6a open at both of its ends. The body 6a and the housing 1 define a passage 8a along the surrounding wall of the housing 1, which passage corresponds to the return passage 8 in the apparatuses according to FIGS. 1 and 2. Numerals 23 and 24 designate foam layers formed on the further gas permeable elements 21 and 22, respectively.

In the operation of the FIG. 3 apparatus, gas to be freed from particles enters through the inlet 16 and passes upwards through the element 3a and the foam layer 11 resting thereon. Foam fractions are then entrained from the foam layer 11 up through the element 21 to the foam layer 23 resting thereon. In the same way, foam fractions are entrained by the continued flow of the gas upwards via the foam layer 24 to the uppermost foam layer 12. While the gas is then discharging upwardly through the channel 2, foam which has been supplied to the foam layer 12 from below runs through the passage 8a to the lowermost foam layer 11. A constant circulation of foam is thus obtained, during operation of the apparatus, from the lowermost foam layer 11 via the foam layers 23 and 24 to the uppermost foam layer 12, and from there back to the lowermost foam layer 11. It will be apparent that the single control means 13-15 in FIG. 3 serves to maintain the four different foam layers with an optimum thickness.

As mentioned before, the described apparatus works according to the principle that a constant circulation of foam is taking place within the apparatus from the lower foam layer to the upper one, via the upper foam supporting element, and back to the lower foam layer through said passage. A prerequisite for a circulation of this kind to take place is that said passage have a certain minimum length so that a foam column present therein will have a height sufficient for the foam column to move downwards by its own weight, against the action of the overpressure prevailing in the space between the foam supporting elements (which is greater than the pressure above the upper foam supporting element).

For different reasons, it sometimes happens in an apparatus of this kind that occasional pressure increases are obtained in the space between the two foam supporting elements. The foam column present in the return passage may then be too low for overcoming, by its weight, the difference between the pressure in said space and the pressure in the space above the uppermost foam supporting element. With particularly large pressure differences, foam will thus be forced up from the lower foam layer to the upper one, via the passage, which may lead to overfilling of the upper foam layer, while the lower foam layer will disappear entirely.

One way of avoiding effects of this kind, due to occasional large pressure increases in the space between the foam supporting elements, would be to make said return passage longer, so that the foam column present therein would be heavy enough for resisting pressure increases of this kind. This would mean, however, that the distance between the foam supporting elements would have to be increased, which would entail an undesired increase of the total height of the apparatus.

According to a preferred embodiment of the present invention, this problem may be solved in a different way, namely, by providing the apparatus with a swingable flap, or the like, at the opening of said return passage in the space between the foam supporting elements, said flap being arranged to be swung by a certain overpressure arising in said space, so that it will close the passage opening and thereby prevent gas and foam from flowing upwards through the passage. The flap will thus serve as a check valve in the passage.

Figure 4:
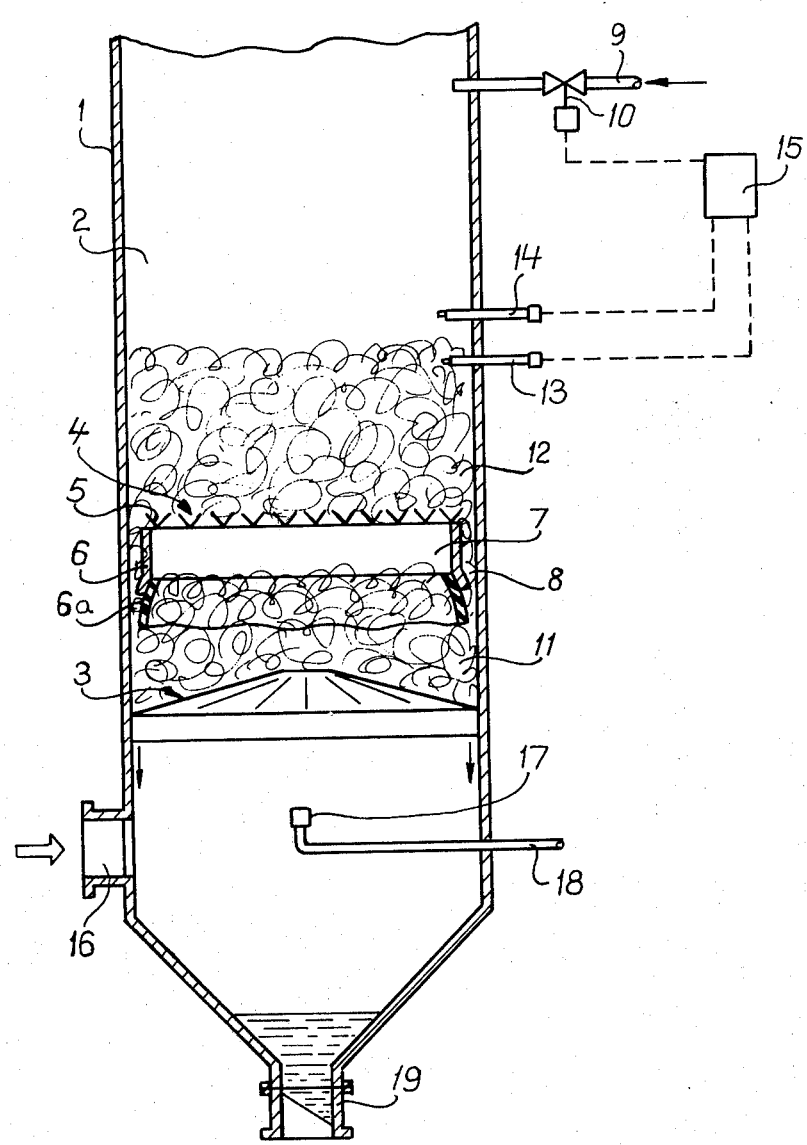

An embodiment of this kind is shown in FIG. 4, wherein on the lower edge of the body 6 there is fastened a relatively broad strip 6a. This strip, preferably made of rubber or some other flexible material, is loosely suspended from the body 6 and may swing outwards from the channel 7 so that it covers the opening of the passage 8 in the space between the foam supporting elements 3 and 4.

During the operation of the apparatus shown in FIG. 4, if the gas pressure below the element 4 is temporarily increased substantially so that the foam column in the passage 8 does not overcome this pressure by its weight, but instead the gas pressure tends to force foam upwards in the passage 8 from the foam layer 11, the rubber strip 6a will be pressed outwards against the housing 1 and prevent gas and foam from moving upwards in the passage 8. As soon as the pressure below the element 4 is again normalized, the rubber strip 6a will return to its position shown in FIG. 4, after which the normal circulation of foam will be resumed.

I claim:
1. In an apparatus for obtaining contact between a gas and a liquid, the combination of means forming a vertical channel, means for introducing said gas into the channel for through-flow of the gas upwards from below, a device for charging the channel with a foam containing said liquid, and upper and lower gas-permeable elements spaced from each other in said channel and each arranged to support a layer of said foam covering the through-flow area of the channel, said elements being formed to cause turbulence of the gas flowing therethrough and being located so close to each other that foam will be entrained by the flowing gas from the space between said elements upwardly through the upper element to the upper side thereof, said channel-forming means at least partly forming also a passage for returning foam from said upper side of the upper element to the space between the elements, said passage being shielded from upward flow of gas therethrough, whereby a foam column present in said passage can move downward.

2. The combination of claim 1, in which said passage is formed along the periphery of the upper foam supporting element.

3. The combination of claim 1, comprising also a hollow body located in said channel and open at its upper and lower parts for through-flow of the gas, said passage being formed between said channel-forming means and the outside of said hollow body.

4. The combination of claim 1, comprising also a check valve associated with said passage and operable to prevent flow of foam upwardly in the passage.

5. The combination of claim 4, in which said check valve comprises a swingable flap mounted at the opening of said passage in the space between the foam supporting elements, said flap being swingable by an overpressure arising in said space to close said opening of the passage and thereby prevent gas and foam from flowing upward through the passage.

6. The combination of claim 5, in which said flap is made of a flexible material such as rubber.

7. The combination of claim 5, comprising also a hollow body located in said channel and open at its upper and lower parts for through-flow of the gas, said passage being formed between said channel-forming means and the outside of the hollow body, said flap being fastened to and suspended from the lower part of the hollow body.

8. The combination of claim 1, comprising also at least one additional gas-permeable foam supporting element located in said channel between said upper and lower foam supporting elements, the vertical distances between adjacent foam supporting elements being so small that foam will be entrained by the upflowing gas from a foam layer on one element to a foam layer on the element next above, the space between said upper element and said additional element being separated from said passage.

9. The combination of claim 8, comprising also a hollow body located in said channel and open at its upper and lower parts for through-flow of the gas, said passage being formed between said channel-forming means and the outside of said hollow body, said additional foam supporting element being located within said hollow body.

* * * * *